(12) United States Patent
Bompard

(10) Patent No.: US 6,992,719 B2
(45) Date of Patent: Jan. 31, 2006

(54) METHOD AND DEVICE FOR FOCUSING A CAMERA UTILIZING FILTERS CONTAINED IN A PROCESSOR

(75) Inventor: Frédéric Bompard, Massy (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 821 days.

(21) Appl. No.: 09/741,654

(22) Filed: Dec. 19, 2000

(65) Prior Publication Data
US 2001/0026323 A1 Oct. 4, 2001

(30) Foreign Application Priority Data
Dec. 21, 1999 (FR) .................................. 99 16135

(51) Int. Cl.
H04N 5/228 (2006.01)
H04N 5/232 (2006.01)
(52) U.S. Cl. ................. 348/345; 348/208.12; 348/349; 348/354; 348/355
(58) Field of Classification Search ........... 348/208.12, 348/345, 349, 354, 355
See application file for complete search history.

(56) References Cited

U.S. PATENT DOCUMENTS

| | | | | |
|---|---|---|---|---|
| 4,967,280 A | * | 10/1990 | Takuma et al. ............. | 348/355 |
| 4,969,045 A | * | 11/1990 | Haruki et al. ............ | 348/229.1 |
| 4,980,773 A | * | 12/1990 | Suda et al. .................. | 348/355 |
| 5,065,246 A | * | 11/1991 | Takemoto et al. .......... | 348/354 |
| 5,396,336 A | * | 3/1995 | Yoshii et al. ............... | 348/345 |
| 5,428,691 A | * | 6/1995 | Ueda .......................... | 382/199 |
| 5,485,209 A | * | 1/1996 | Muramoto et al. ......... | 348/349 |
| 5,666,562 A | * | 9/1997 | Kaneda et al. ................ | 396/49 |
| 6,151,415 A | * | 11/2000 | Acharya et al. ............ | 382/255 |
| 6,342,922 B1 | * | 1/2002 | Mizoguchi ................... | 348/355 |
| 6,421,087 B1 | * | 7/2002 | Ikeda .......................... | 348/345 |
| 6,507,367 B2 | * | 1/2003 | Yasuda ....................... | 348/355 |
| 6,512,549 B1 | * | 1/2003 | Iijima et al. ................ | 348/349 |
| 6,525,763 B1 | * | 2/2003 | Maeda ......................... | 348/96 |

FOREIGN PATENT DOCUMENTS

EP 0944263 A1 9/1999

* cited by examiner

Primary Examiner—Thai Tran
Assistant Examiner—James M. Hannett
(74) Attorney, Agent, or Firm—Aaron Waxler

(57) ABSTRACT

This digital camera comprises a lens system (5) for focusing the image of a subject (10) on a sensitive plate (7), a control system formed, inter alia, by a motor (8) that act on the lens system to ensure a sharp image of the subject on the sensitive plate.

To obtain this clarity of the subject on the plate, a first high-pass image filter (18) is used and a first low-pass image filter (15). As these filters also form part of the digital processing of image compression for recording the images, few additional means are to be provided for the automatic focusing that yields the clarity.

6 Claims, 2 Drawing Sheets

METHOD AND DEVICE FOR FOCUSING A CAMERA UTILIZING FILTERS CONTAINED IN A PROCESSOR

BACKGROUND OF THE INVENTION

The invention relates to a camera comprising:

a lens system for focusing the image of a subject on a sensitive plate, an image processing device utilizing filters for performing an image compression transformation, a control system acting on the lens system to ensure a sharp image of the subject on the sensitive plate, the system comprising at least a first high-pass image filter and a first low-pas image filter in the form of summers of the results of the compression transformation.

The invention also relates to a focusing method for a camera.

The invention finds its application in digital cameras.

To obtain a proper focusing and thus a sharp image it is known that the transactions in the image are analyzed because they are often more abrupt on the subject to be photographed than on the background. It is estimated that the focal distance of the lens of the camera is optimal when the transitions in the image are the most abrupt.

The present invention proposes a camera for which the focusing is effected in a simple manner without needing too much additional material.

Therefore, such a camera is characterized in that said image filters utilize the filters of the image-processing device.

A focusing method utilized in a camera that comprises an image processing circuit in the form of high-pass and low-pass image filters is characterized in that it comprises the following steps:

estimation of the value of the output of at least one of said high-pass filters, normalization of this value by means of the value of the output of a low-pass filter, control of the focusing system with a view to obtaining a maximum value of the normalized signal, release for taking the photo if the normalized value exceeds a certain threshold.

SUMMARY OF THE INVENTION

The idea of the invention is to take advantage of the calculations necessitated by the image compression technique known by the name of "wavelet technique" as mentioned in the standard JPEG 2000 to obtain the automatic focusing. The wavelet technique is well known. On this subject may be consulted European patent document EP 0 944 263 which mentions the new standard of image compression JPEG 2000.

These and other aspects of the invention are apparent from and will be elucidated with reference to the embodiment described hereinafter.

DESCRIPTION OF THE PREFERRED EMBODIMENTS

Figure 1:
FIG. 1 represents a camera according to the invention.
Figure 1:
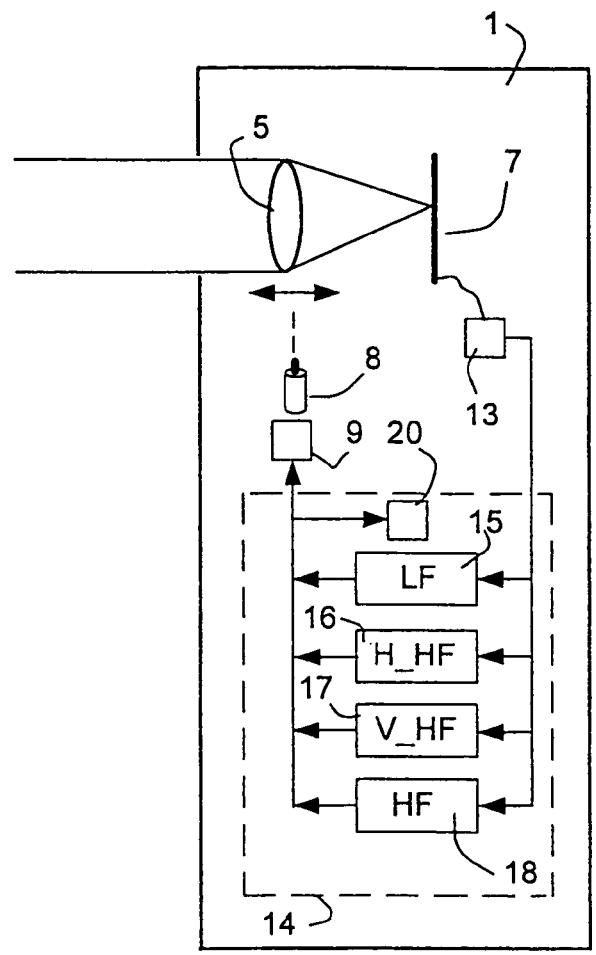

FIG. 1 represents an apparatus 1 according to the invention. This apparatus is formed by a lens 5 which focuses the images on a sensitive surface 7 of the CCD sensor type. The focal distance of the lens may change under the influence of a motor 8 controlled by a control circuit 9, so that the subject 10 placed in front of a background 12 can appear sharply on the sensitive surface 7. This surface is analyzed by an analysis circuit 13 to produce information about the various pixels that form the information. These pixels are then processed for performing image compression by an image processor 14, which utilizes a wavelet transformation. Image filters 15, 16, 17 and 18 are realized in that the results of the wavelet transformation are summed in a simple fashion. After compression, the captured image is stored in a memory device 20.

According to the invention the presence of these image filters is made use of for obtaining the focusing that ensures the clarity of the subject on the sensitive surface 7. This may be derived from information coming from a low-pass image filter 15 and a high-pass filter 16. A sharp subject creates distinct transitions which make a contribution to the output of the high-pass filters, whereas the background situated farther away remains blurred and its contribution is thus less. All these filters may be one or two-dimensional.

From these four summers 15, 16, 17 and 18 are established four parameters: $\alpha$, $\beta$, $\chi$ and $\delta$ respectively, which relates to the luminance data Y:

$$\alpha = \sum_{LF} Y$$

$$\beta = \sum_{H\_HF} Y$$

$$\chi = \sum_{V\_HF} Y$$

$$\delta = \sum_{HF} Y$$

It is estimated that the subject 10 sharply appears on the surface 7 when the output of at least one high frequency image filter ($\beta$, $\chi$ or $\delta$) is maximal. The output of the low-frequency image filter 15 is used to do away with level variations and normalize as it were the value of the signals on the output of the filters $\beta$, $\chi$ or $\delta$.

According to an example of embodiment, there will be a sharp image when the value $HF_c$ will be maximal:

$$HF_C = \frac{\beta + \chi + \delta}{\alpha}$$

Figure 2:
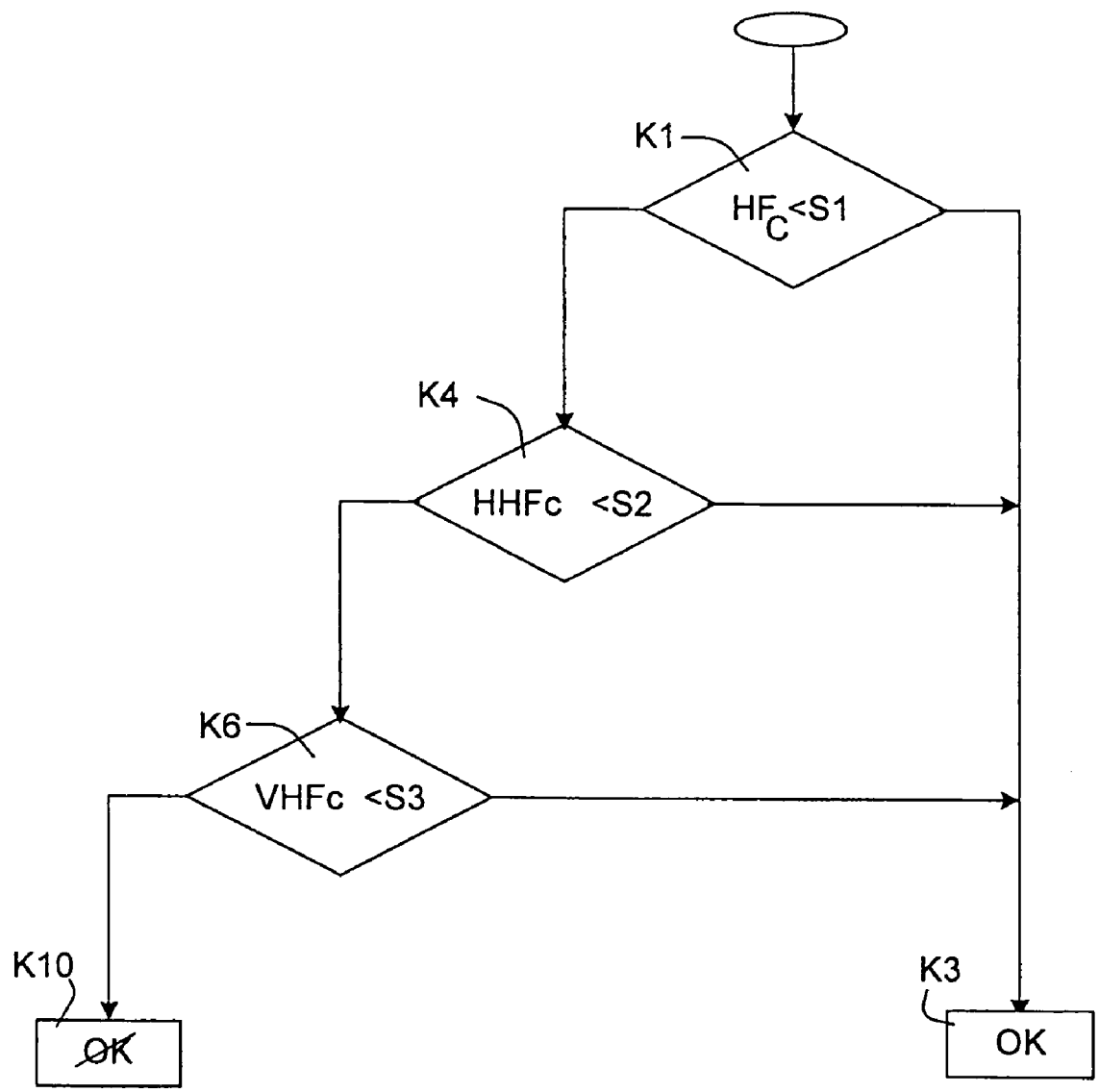
FIG. 2 represents a function flow chart of the apparatus according to the invention.

In other cases an operation explained with the aid of the flow chart of FIG. 2 will be used.

First is examined (box K1) the value of the maximum $HF_c$ obtained by the movement of the lens 5. If this maximum is higher than a certain threshold, the photo is taken which is indicated by box K3. If this value is lower than this threshold, the maximum value taken by the value $HHF_c$ is examined (box K4):

$$HHF_c = \frac{\beta}{\alpha}$$

If this value attains a maximum higher than a certain threshold S2, box K3 is proceeded to, if not, the value $VHF_c$ is examined (box K6):

$$VH_c = \frac{\chi}{\alpha}$$

If this value reaches a higher value than threshold S3, the photo is recorded (box K3), if not, a message or any other indicator signals that the focusing cannot be performed (box K10).

Obviously, the described processing is preferred on part of the image situated in the center of the sensitive surface 7, which facilitates the use of the apparatus.

What is claimed is:

1. A camera comprising:
 a lens system for focusing the image of a subject on a sensitive plate,
 an image processing device utilizing filters for performing an image compression transformation,
 a control system acting on the lens system to ensure a sharp image of the subject on the sensitive plate, the image processing device comprising at least a first high-pass image filter and a first low-pas image filter in the form of summers of the results of the compression transformation, wherein information from both the first high-pass image filter and the first low-pass image filter are used to derive the image compression transformation, and
wherein the filters utilized by said image processing device comprise said image filters.

2. An apparatus as claimed in claim 1, characterized in that the summers are filters adapted to said compression transformation.

3. An apparatus as claimed in claim 1, characterized in that the summers are filters adapted to the standard called JPEG 2000.

4. An apparatus as claimed claim 1 comprising a plurality of image processing filters among which are high-pass and low-pass filters, characterized in that the output of at least one of the high-pass filters is estimated while taking the value of the output of a low-pass filter into account.

5. A method of using a camera, said camera comprising:
 a lens system for focusing the image of a subject on a sensitive plate; an image processing device utilizing filters for performing an image compression transformation; a control system acting on the lens system to ensure a sharp image of the subject on the sensitive plate, the image processing device comprising at least a first high-pass image filter and a first low-pas image filter in the form of summers of the results of the compression transformation,
wherein information from both the first high-pass image filter and the first low-pass image filter are used to derive the image compression transformation; wherein the filters utilized by said image processing device comprise said image filters utilize filters of the image processing device
 said method comprising the following steps:
 estimation of the value of the output of at least one of said high-pass filters,
 normalization of this value by means of the value of the output of a low-pass filter,
 control of the focusing system with a view to obtaining a maximum value of the normalized signal,
 release for taking the photo if the normalized value exceeds a certain threshold.

6. A method as claimed in claim 5, characterized in that it further includes the following steps when said threshold value is not exceeded:
 estimation of another value coming from one of said high-pass filters,
 release for taking the photo if this other value exceeds a threshold,
 taking another output of another high-pas filter into account if the latter threshold is not exceeded.

* * * * *